G. L. CHANIER.
FILM PRINTING MACHINE.
APPLICATION FILED SEPT. 12, 1921.

1,425,450.

Patented Aug. 8, 1922.
3 SHEETS—SHEET 1.

INVENTOR
G. L. Chanier
by Wilkinson & Giusta
ATTORNEYS.

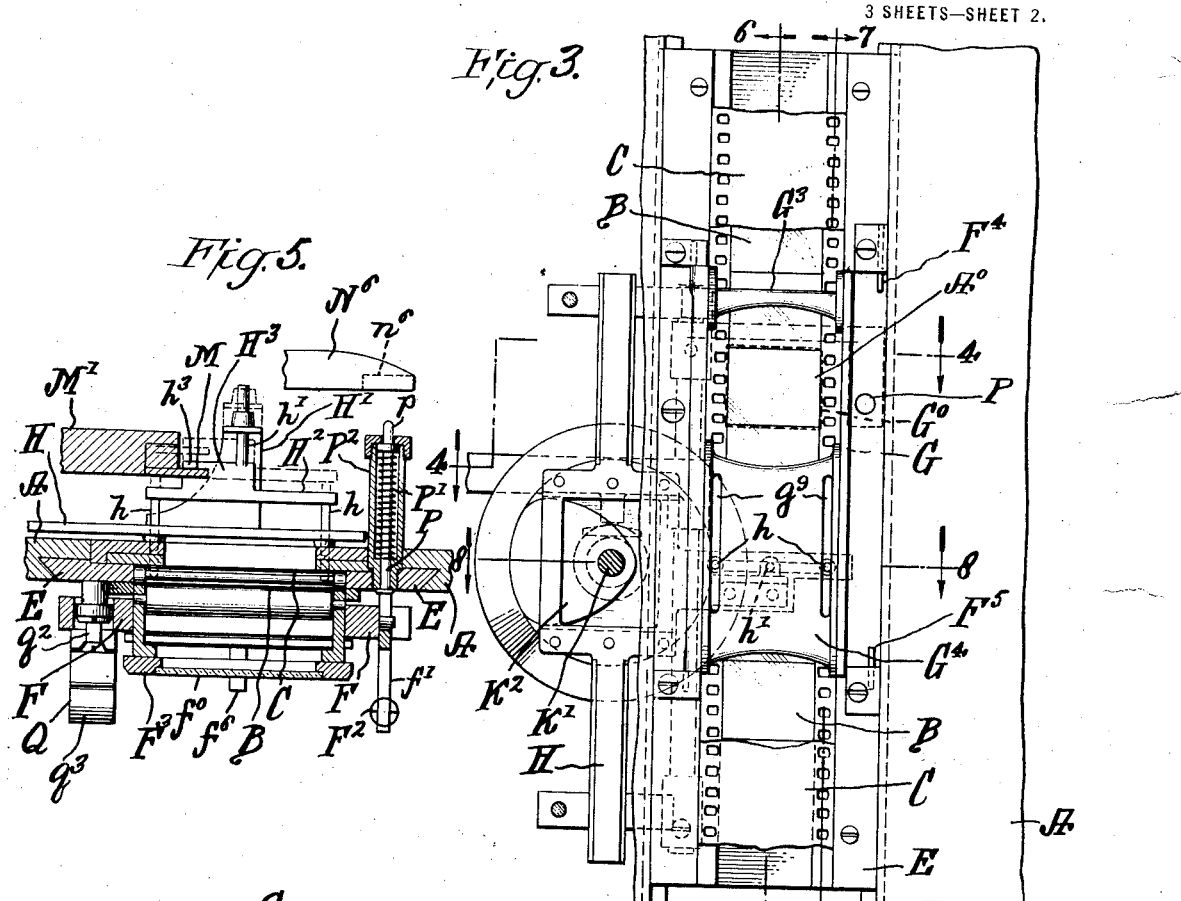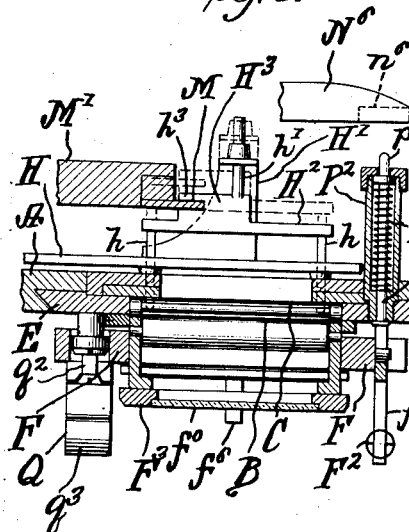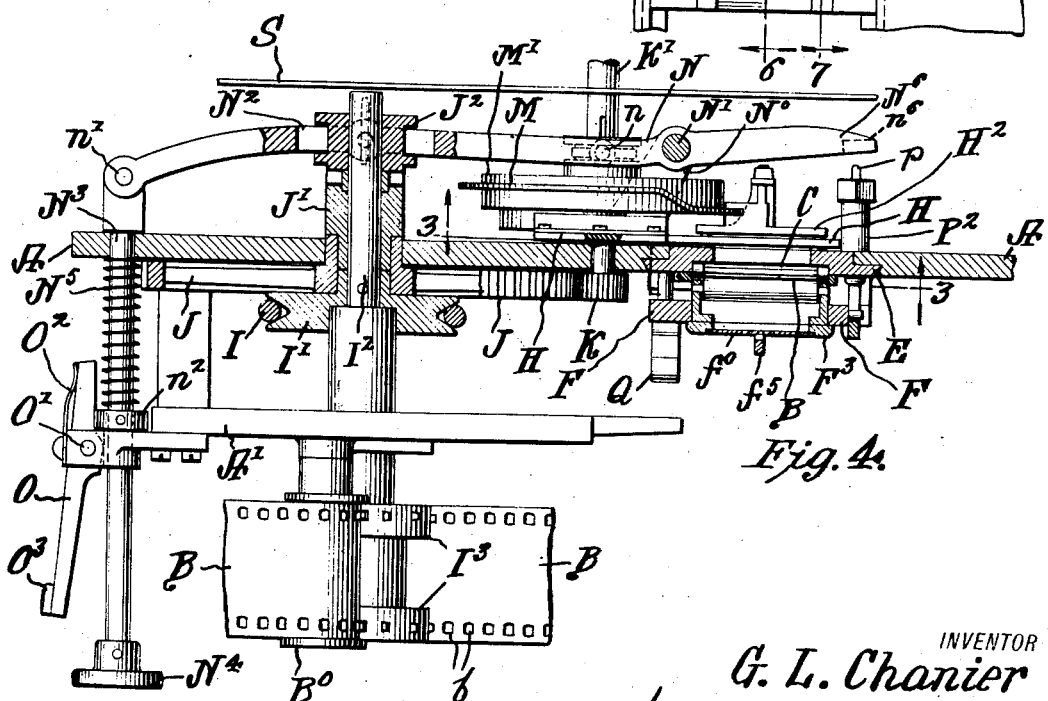

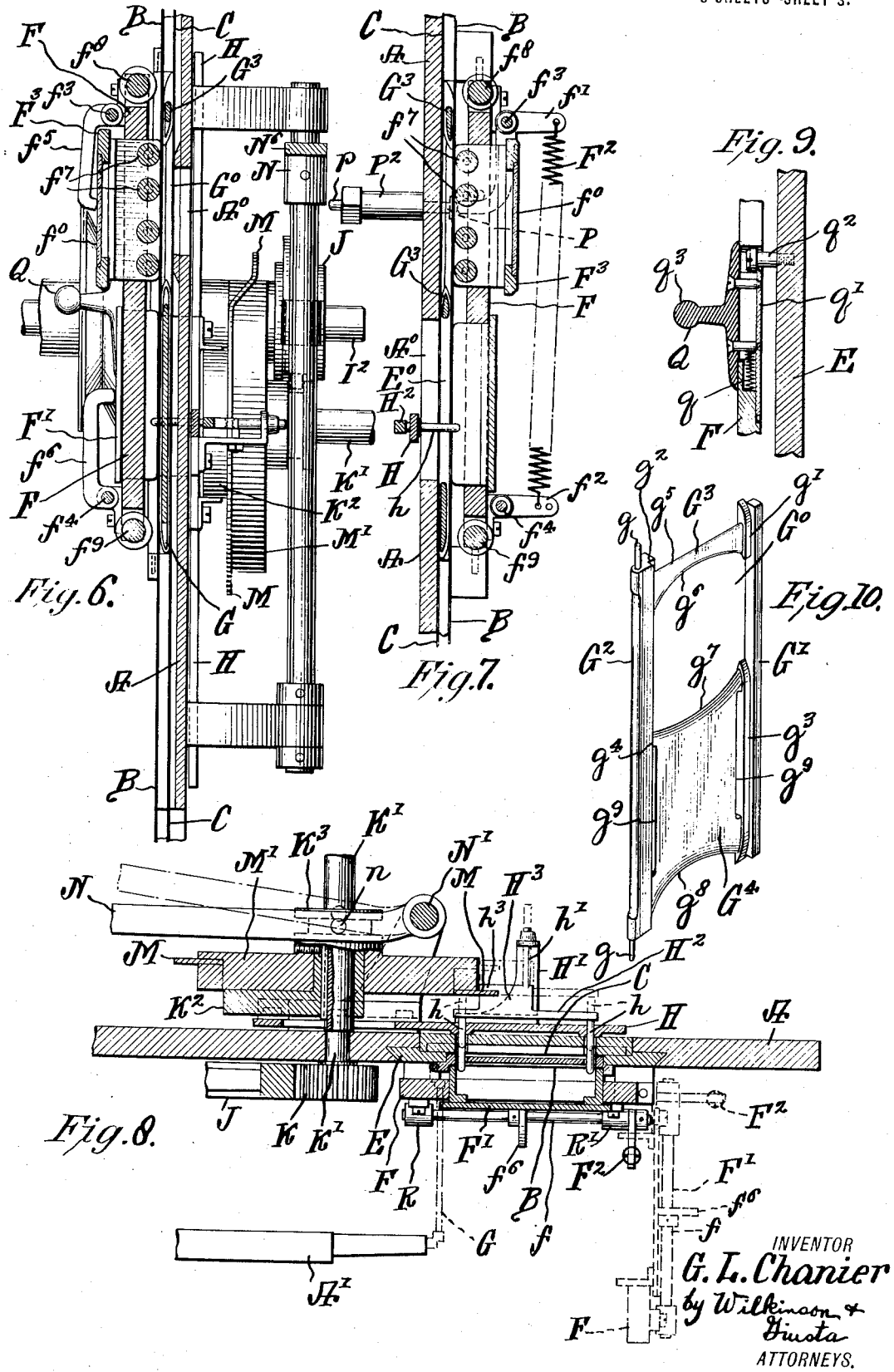

UNITED STATES PATENT OFFICE.

GASTON L. CHANIER, OF JERSEY CITY, NEW JERSEY, ASSIGNOR TO PATHÉ EXCHANGE, INC., OF NEW YORK, N. Y., A CORPORATION OF NEW YORK.

FILM-PRINTING MACHINE.

1,425,450.   Specification of Letters Patent.   Patented Aug. 8, 1922.

Application filed September 12, 1921. Serial No. 499,952.

*To all whom it may concern:*

Be it known that I, GASTON LOUIS CHANIER, a citizen of the United States, residing at Jersey City, in the county of Hudson and State of New Jersey, have invented certain new and useful Improvements in Film-Printing Machines; and I do hereby declare the following to be a full, clear, and exact description of the invention, such as will enable others skilled in the art to which it appertains to make and use the same.

My present invention relates to improvements in film printing machines, and it is intended to provide a simple and efficient apparatus which may be conveniently used to print from a negative film and leave out such parts of the same as may be desired to omit.

When making motion picture prints from a negative film, it may be desirable to omit the printing of certain sections of this negative. The usual way to do this is to stop the machine, open the gate and take both the negative and positive films out. The section of negative film which should not be printed is then pulled by hand up to the place where printing should be resumed. The machine is then threaded again and started. This entails a loss of time and handling of the negative film during which it may be spoiled.

This invention permits the omitting of the printing of any part of a negative without any of the abovementioned operations.

This is accomplished by putting between the two films an additional gate made so that they will be in immediate contact only in front of the printing aperture. Whenever it is decided not to print a section of the negative, a lever is pulled, which lever releases the pressure on the films and shifts back the film actuating mechanism in such a manner that it will engage only in the perforations of the negative film. The latter will then continue to move through the machine, the positive film meanwhile remaining stationary. When the undesirable section of the negative has all been run through the machine, the release of the lever permits the film actuating mechanism to come back to its original position, thereby actuating again the two films.

My invention will be more fully understood after reference to the accompanying drawings, in which like parts are indicated by similar reference symbols throughout the several views, and in which:—

Figure 3 is a similar view to Fig. 1, but shows part only of the details of said figure, the door being omitted and parts being shown in section, and the scale being much larger than in Figure 1.

Figure 4 shows a section along the line 4—4 of Figs. 1 and 3, and looking down.

Figure 5 is an enlarged view of the right hand portion of Fig. 4.

Figure 6 shows a vertical section along the line 6—6 of Figs. 1 and 3, and looking in the direction of the arrows.

Figure 7 shows a vertical section along the line 7—7 of Figs. 1 and 3, and looking in the direction of the arrows.

Figure 8 shows a section along the line 8—8 of Figs. 1 and 3, and looking in the direction of the arrows.

Figure 9 is a sectional view showing details of parts of the door latch shown in Fig. 6; and Figure 10 is a detail view showing the intermediate gate or door which is used to separate the two films during the time that it is desired to omit the printing of parts of the negative film.

A represents a face plate constituting part of a frame on which the various parts are supported.

Figure 1:
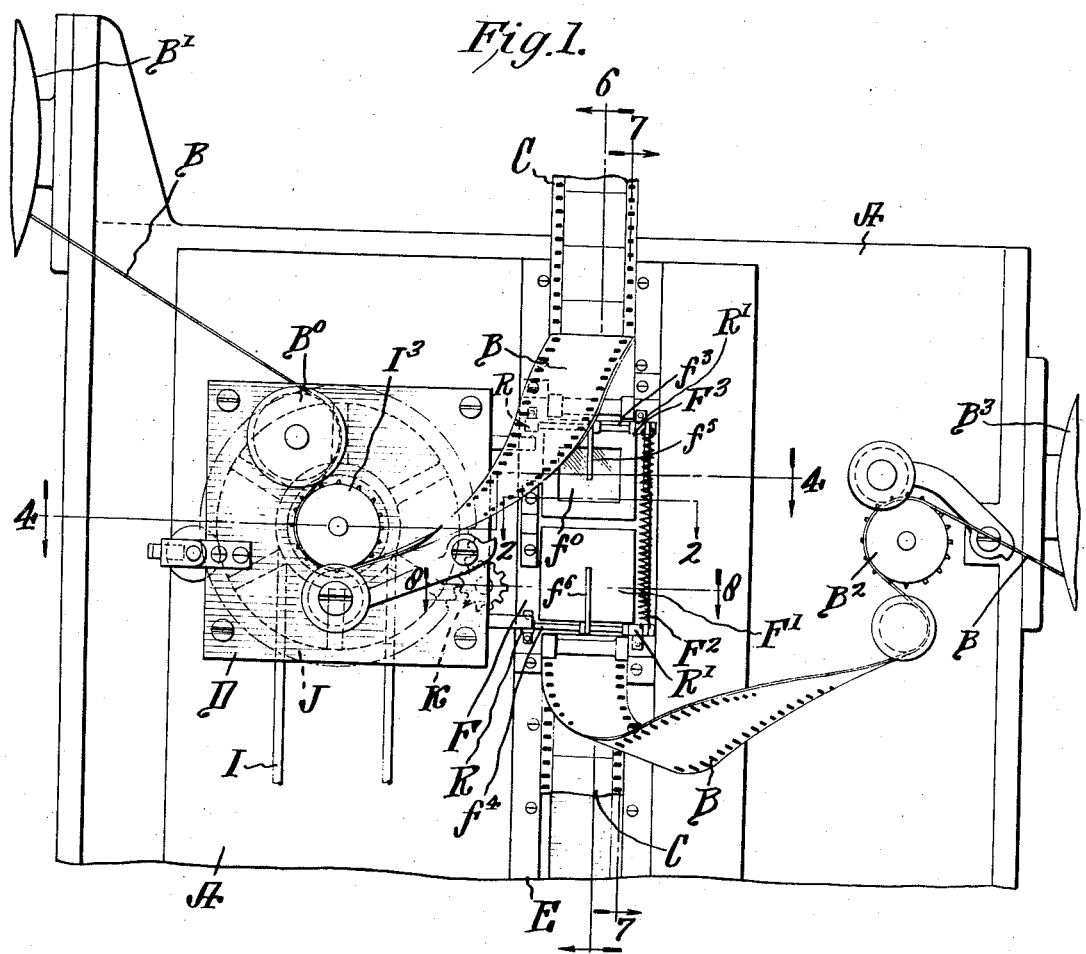
Figure 1 is a front elevation of the apparatus as mounted upon a vertical plate, parts being omitted.

B represents the positive film which is conveyed from the holder B' to the re-winder for the positive film over the guide roll $B^0$ and the feed roll $I^3$, and through the various leads that will be hereinafter described, to the tension device $B^2$, and thence to the re-winder $B^3$ for the positive film, as indicated in Fig. 1.

C represents the negative film which is fed down from the negative film holder, not shown, across the face of the plate A and is re-wound on the re-winder for the negative film, also not shown. These winders and re-winders are well known in the art, and not being a part of my present invention it is not necessary to illustrate the same herein.

The plate A is provided with a panel D, to which are journaled, or otherwise connected, various of the operative parts, as will be hereinafter more fully described. This plate A is also provided with a slotted panel E along which the films are drawn in a downward direction, as shown in Fig. 1, and this panel is provided with guideways for said films, with a light aperture A⁰ (see Fig. 6), and with two doors F and G. The door F is provided with two pressure plates F' and F³. The pressure plate F³ is provided with a small pane f⁰, made of red glass, to permit inspection of the two films as they pass behind same. The lower pressure plate F' is opaque to light.

These two plates F' and F³ are pressed on the films by means of the pressure spring F² which acts upon the arms f' and f² which are fast to the rods f³ and f⁴ journaled in R and R' on either side of the door F (see Figs. 1 and 8), and on the fingers f⁵ and f⁶ respectively, fast on the rods f³ and f⁴. In other words, this pressure spring and the presser fingers controlled thereby, tend to press the plates F' and F³ inwards towards the slotted panel E, the pressure frame F³ pressing the two films B and C together, unless the pressure is relieved as will be hereinafter more fully described.

One or both of the pressure plates may be provided with anti-friction rollers f⁷, as shown in Figs. 6 and 7. The door F is hinged on pivots F⁴ and F⁵ (see Fig. 3) so as to swing out laterally as indicated in dotted lines in Figure 8.

The door G or intermediate gate or spacer shown in detail in Figure 10, separates the films, as will be hereinafter described. This gate is hinged by the rod g, to swing laterally as indicated in dotted lines in Figure 8. This gate is provided with peculiarly shaped cross bars G³ and G⁴, having rounded edges g⁵, g⁶, g⁷, and g⁸, respectively. Adjacent the side rails G' and G² these cross pieces G³ and G⁴ have guideways g', g², g³ and g⁴ for the edges of the positive film; said cross pieces being curved inwardly in the center so that the positive film will not touch the same except at the edges, when the two films are pressed together as will be hereinafter described.

The cross piece G⁴ is provided with elongated slots g⁹ to permit the passage therethrough of the reciprocating feed pins or claws h which serve to intermittently feed one or both of the films, as will be hereinafter more fully described.

Between the cross pieces G³ and G⁴ is an aperture G⁰ to permit the passage of light therethrough during the printing operation, and also to permit the positive film B, coming in close contact with the negative film C, under the action of spring F², as already described.

The mechanism for imparting the intermittent feed to the two films is well known in the art and will be briefly described as follows:

H represents a reciprocating slotted plate which is reciprocated by means of the cam K², mounted on the shaft K', which is driven by a pulley, not shown, or by any other means. The pinion K is fast on the shaft on K', and drives the gear wheel J which is fast on part J' of the clutch mechanism (see Figs. 1-3-4-6). The pulley I', fast on the shaft I², revolves with the gear J whenever the clutch member J² is in mesh with the clutch member J', and by means of the belt I, runs the film rewinder (not shown) for rewinding the film B. On the shaft I² is mounted the tooth feed wheel I³ which engages the perforations b in the positive film B shown in Fig. 4, so that the rotation of the shaft will feed the positive film, as will be hereinafter more fully described.

M represents the cam plate which moves the claws h in or out, which cam plate is mounted on the wheel M'.

In order to hold the lever N in the position for permitting the negative film to be fed, but not the positive film, I provide a spring stop O, pivoted as at O' to a part of the framework A' of the apparatus, and this spring stop is normally pressed inwards by the spring O² and may be released by pressure on the handle O³. It will be seen that if the handle N⁴ be pressed inwards (or upward as shown in Fig. 4) this spring stop O will snap in, in front of the collar n², and will hold the rod N³ and with it the lever in the backward or withdrawn position.

Figure 2:
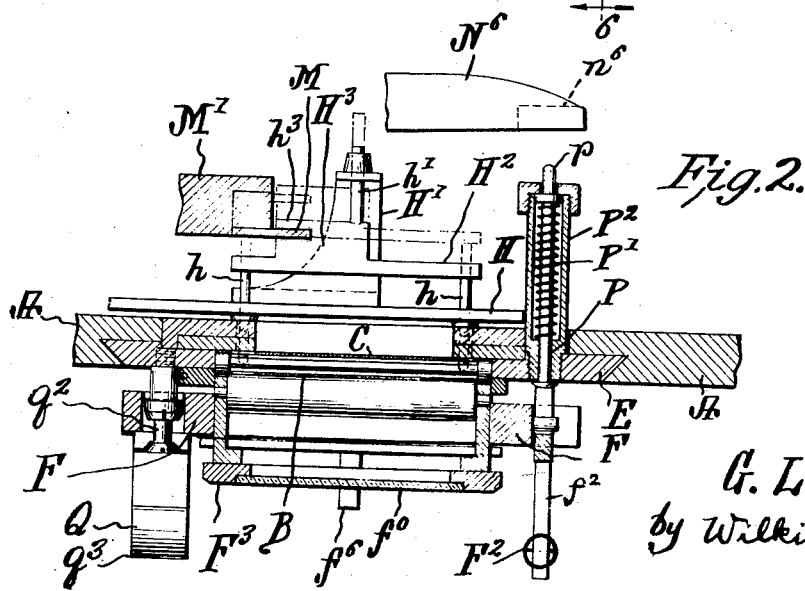
Figure 2 shows a section on a larger scale along the line 2—2 of Fig. 1, and looking in the direction of the arrows.

The reciprocating feed plate H which is reciprocated by the cam K² carries an inwardly, (or upwardly—as shown in Figs. 2 and 8) projecting standard H', in which slides the guide rod h' attached to the feed piece H² carrying the claws h.

The feed piece H² is thickened as at H³ to provide space for a cam groove h³, see Fig. 8, which engages the cam plate M. Thus the rotation of the wheel M' will cause the cam plate to move the claws h backwards and forwards engaging or disengaging the same from the holes in the edges of the films, and at the same time, the rotation of the cam K² will impart a reciprocating motion to said claws and thereby giving an intermittent feed to the films whenever said claws are in the engagement therewith, as is well known in the art.

In order to provide for feeding the negative film only, and not the positive film when desired, I provide the following mechanism, besides the intermediate gate G already described.

The wheel M' has been made movable in or out through a slight distance on the shaft K' (see Figs. 4 and 8), such motion being effected by the collar arrangement K³ on the shaft K' engaging pins $n$ carried by the releasing lever N, which releasing lever N is pivoted at one end by being secured to the rock shaft N', and is provided with a slot N² to receive the clutch member J², keyed on shaft I², (see Figs. 4 and 8), and the free end of said lever is pivoted as at $n'$ to the hand rod N³ carrying the actuating handle N⁴. This rod N³ also carries a compression spring N⁵, see Fig. 4, which engages the set collar $n^2$ and normally tends to restore the said rod to the initial or operative position for printing shown in Fig. 4.

The releasing lever N has an arm N⁶ (see Figs. 2 and 4), which arm has an engaging lug $n^6$ adapted to engage the point $p$ of the spring plunger P, see Fig. 2, which plunger is normally pressed up into the initial position shown in Fig. 2, by means of the spring P'. This plunger and spring are contained in a casing P² shown in elevation in Figs. 4 and 7 and in section in Figs. 2 and 5.

The plunger P, when pressed outwardly (down, as shown on Fig. 2) by the lug $n^6$, engages the lower part of the finger $f'$ (shown in dotted lines in Fig. 7), turning the rod $f^3$, thereby releasing the pressure of finger $f^5$ on pressure frame F³, consequently relieving the pressure of said frame on the positive film B. This will not affect the pressure on the other pressure frame F' in any way, but will simply prevent the two films, B and C, from being pressed together by the rollers $f^7$ through the aperture G⁰, and thus the positive film will automatically be separated from the negative film behind the intermediate gate G.

The same action of the lever N, that will cause the release of pressure just referred to, will also move the cam wheel M' far enough rearwards to prevent the cam M from moving the claws $h$ far enough through the slots $g^9$ in the gate G to engage the positive film, and consequently the feed mechanism will continue to impart a step by step movement to the negative film, but the positive film will remain without any further movement until the parts are restored to the normal operative position shown in Fig. 4.

The sliding movement of the wheel M' on the shaft K' should be just sufficient to cause the feed claws $h$ to be withdrawn from any possible engagement with the positive film, when the pressure is relieved as already described, and yet will permit these claws to intermittently engage and intermittently move the negative film. Thus, by a simple movement of the handle N⁴, controlling the lever N, the machine may be shifted from the position in which both films are fed simultaneously forward, and are in contact at the desired moment of printing, to the position in which the two films are separated and the negative film alone is fed forward.

This movement of the negative film alone may be continued as long as desired, or until the operator, looking through the red glass pane $f^0$, notes that the negative film has reached that position where it is desired to resume the printing operation, at which time by simply pressing on the part $o^3$ of the spring latch O, the spring N⁵ will snap the lever N back to the initial position shown in Fig. 4 and the machine will be ready to go ahead with the operation of simultaneously feeding both the films and the operation of printing as before described.

A suitable door latch O, see Figs. 6 and 9, may be provided for latching the door F, which comprises a knob $q^3$ fast on the sliding plate $q'$ which engages the catch $q^2$ screwed in plate E, the spring $q$ pushing the latch upwards against the catch.

The white light, not shown, would be hid by the shutter S, see Fig. 4, and these would be controlled in the usual way, such control not being a part of my present invention will not be described herein.

The operation of the device is as follows:

The positive and negative films being threaded in the machine as shown in Fig. 1, and it being desired to begin the operation of printing, start the motor and see that the operating handle N⁴ and lever N are in the position shown in Fig. 4. The clutch mechanism will now be in the position shown in full lines in Figs. 4, 5, and 8, and the feed claws $h$ will be in such position that they will be intermittently drawn through the perforations in the edges of both negative and positive films, causing the two films to be fed simultaneously through the apparatus, while at the same time the two films will be pressed together through the aperture G⁰ by the pressure spring F².

The operation of printing may be continued indefinitely as long as the supply of the two films lasts. If it is desired to cut out or omit parts of the negative film in printing on the positive film, push the handle N⁴ backwards until the spring catch O snaps into engagement with the collar $n^2$ on the rod N³. The lever N will then be in a position shown in dotted lines in Fig. 8, and the arm N⁶ will press the spring plunger P forwards, releasing the pressure on the door F and permitting the positive film to move away from the negative film under the normal tension on the positive film.

The movement of the cam M on the shaft K' will now permit the claws $h$ to enter the perforations in the edges of the negative film only, and the negative film will be moved by and clear of the positive film, and such motion will continue indefinitely until it is desired either to stop the machine or to restore the parts to the initial position shown in Fig. 4. At the same time, the clutch member J² is disengaged thereby preventing the wheel J from driving the positive feed wheel I³ and the positive rewinding pulley I'. The restoration of the parts to the initial position is accomplished by simply pressing on the finger lug O³ of the spring catch O, and the spring N⁵ will swing the lever N back to the initial position. At the same time the pressure plunger P being released, the pressure spring F² will restore the pressure on both the pressure plates, and the machine will be ready for simultaneously feeding both films and for the resumption of the printing operation.

It will be obvious that various modifications might be made in the herein described apparatus, and in the construction, combination and arrangement of parts, which could be used without departing from the spirit of my invention; and I do not mean to limit the invention to such details except as particularly pointed out in the claims.

Having thus described my invention what I claim and desire to secure by Letters Patent of the United States is:—

1. Apparatus for printing cinema films, comprising a partition with a light aperture therein, manually operated means for pressing the two films together in front of said aperture and for separating same as and when desired, feed mechanism for simultaneously passing the negative film and the positive film to be printed while in contactual relation past said aperture, and means for causing said feed mechanism to move the negative film only past said aperture while the films are separated.

2. Apparatus for printing cinema films, comprising a partition with a light aperture therein, manually operated means for pressing the two films together in front of said aperture and for separating same as and when desired, reciprocating claw feed mechanism for simultaneously passing the negative film and the positive film to be printed while in contactual relation past said aperture, and means for causing said mechanism to engage the negative film only while the films are separated.

3. Apparatus for printing cinema films, comprising a partition with a light aperture therein, manually operated means for pressing the two films together in front of said aperture and for separating same as and when desired, reciprocating claw feed mechanism for simultaneously moving the negative film and the positive film to be printed while in contactual relation past said aperture, and a cam arrangement, with mechanism for controlling same for causing said feed mechanism to engage the negative film only past said aperture while the films are separated.

4. Apparatus for printing cinema films, comprising a partition with a light aperture therein, a spring impressed plate pressing the two films together in front of said aperture, and a perforated gate for separating same when desired, means for simultaneously passing the negative film and the positive film to be printed while in contactual relation past said aperture, and means for relieving the pressure on said plate and permitting the negative film only to move past said aperture while the films are separated.

5. Apparatus for printing cinema films, comprising a partition with a light aperture therein, a spring impressed plate pressing the two films together in front of said aperture, and a perforated gate for separating same as desired, feed mechanism for simultaneously passing the negative film and the positive film to be printed while in contactual relation past said aperture, and means for relieving the pressure on said plate and permitting said feed mechanism to move the negative film only past said aperture while the films are separated.

6. Apparatus for printing cinema films, comprising a partition with a light aperture therein, a spring impressed plate pressing the two films together in front of said aperture, and a perforated gate for separating same when desired, means for simultaneously passing the negative film and the positive film to be printed while in contactual relation past said aperture, a spring plunger and means operated thereby for relieving the pressure on said plate and permitting the negative film only to move past said aperture while the films are separated, and a lever for throwing said plunger into and out of operation.

7. Apparatus for printing cinema films, comprising a partition with a light aperture therein, a spring impressed plate pressing the two films together in front of said aperture, and a perforated gate for separating same as desired, feed mechanism for simultaneously passing the negative film and the positive film to be printed while in contactual relation past said aperture, a spring plunger and means operated thereby for relieving the pressure on said plate and permitting said feed mechanism to move the negative film only past said aperture while the films are separated, and a lever for throwing said plunger into and out of operation.

8. Apparatus for printing cinema films, comprising a partition with a light aperture therein, a spring impressed plate pressing the two films together in front of said aperture, and a perforated gate for separating same when desired, means for simultaneously passing the negative film and the positive film to be printed while in contactual relation past said aperture, a spring plunger and means operated thereby for relieving the pressure on said plate and permitting the negative film only to move past said aperture while the films are separated, and a lever for throwing said plunger into and out of operation, with a spring controlled stop for holding said lever in engagement with said plunger.

9. Apparatus for printing cinema films, comprising a partition with a light aperture therein, a spring impressed plate pressing the two films together in front of said aperture, and a perforated gate for separating same as desired, feed mechanism for simultaneously passing the negative film and the positive film to be printed while in contactual relation past said aperture, a spring plunger and means operated thereby for relieving the pressure on said plate and permitting said feed mechanism to move the negative film only past said aperture while the films are separated, and a lever for throwing said plunger into and out of operation, with a spring controlled stop for holding said lever in engagement with said plunger.

10. Apparatus for printing cinema films, comprising a partition with a light aperture therein, a spring impressed plate pressing the two films together in front of said aperture, and a perforated gate for separating same when desired, means for simultaneously passing the negative film and the positive film to be printed while in contactual relation past said aperture, a spring plunger and means operated thereby for relieving the pressure on said plate and permitting the negative film only to move past said aperture while the films are separated, and a lever for throwing said plunger into and out of operation, with means controlled by said lever for feeding one or both of said films, as desired.

11. Apparatus for printing cinema films, comprising a partition with a light aperture therein, a spring impressed plate pressing the two films together in front of said aperture, and a perforated gate for separating same when desired, means for simultaneously passing the negative film and the positive film to be printed while in contactual relation past said aperture, a spring plunger and means operated thereby for relieving the pressure on said plate and permitting the negative film only to move past said aperture while the films are separated, and a lever for throwing said plunger into and out of operation, with a spring controlled stop for holding said lever in engagement with said plunger, with means controlled by said lever for feeding one or both of said films, as desired.

12. Apparatus for printing cinema films, comprising a partition with a light aperture therein, a spring impressed plate pressing the two films together in front of said aperture, and a perforated gate for separating same as desired, feed mechanism for simultaneously passing the negative film and the positive film to be printed while in contactual relation past said aperture, a spring plunger and means operated thereby for relieving the pressure on said plate and permitting said feed mechanism to move the negative film only past said aperture while the films are separated, and a lever for throwing said plunger into and out of operation, with means, controlled by said lever, for actuating said feed mechanism, and feeding one or both films as desired.

13. Apparatus for printing cinema films, comprising a partition with a light aperture therein, a spring impressed plate pressing the two films together in front of said aperture, and a perforated gate for separating same as desired, feed mechanism for simultaneously passing the negative film and the positive film to be printed while in contactual relation past said aperture, a spring plunger and means operated thereby for relieving the pressure on said plate and permitting said feed mechanism to move the negative film only past said aperture while the films are separated, and a lever for throwing said plunger into and out of operation, with a spring controlled stop for holding said lever in engagement with said plunger, with means, controlled by said lever, for actuating said feed mechanism, and feeding one or both films as desired.

GASTON L. CHANIER.